(12) United States Patent
Lin

(10) Patent No.: US 12,225,580 B2
(45) Date of Patent: Feb. 11, 2025

(54) METHOD AND UE FOR UPLINK TRANSMISSION IN BASE STATION SHARED CHANNEL OCCUPANCY TIME

(71) Applicant: GUANGDONG OPPO MOBILE TELECOMMUNICATIONS CORP., LTD., Guangdong (CN)

(72) Inventor: Hao Lin, Neuilly-sur-seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 323 days.

(21) Appl. No.: 17/805,203

(22) Filed: Jun. 2, 2022

(65) Prior Publication Data

US 2022/0295553 A1    Sep. 15, 2022

Related U.S. Application Data

(63) Continuation of application No. PCT/CN2020/133558, filed on Dec. 3, 2020.

(30) Foreign Application Priority Data

Dec. 3, 2019   (WO) .................. PCT/IB2019/001430

(51) Int. Cl.
*H04W 74/0808* (2024.01)
*H04L 27/26* (2006.01)
*H04W 74/00* (2009.01)

(52) U.S. Cl.
CPC ..... *H04W 74/0808* (2013.01); *H04L 27/2607* (2013.01); *H04W 74/006* (2013.01)

(58) Field of Classification Search
CPC ........... H04W 74/0808; H04W 74/006; H04W 16/14; H04W 74/0816; H04W 56/005; H04L 27/2607; H04L 27/2646; H04L 5/0053

See application file for complete search history.

(56) References Cited

U.S. PATENT DOCUMENTS

| | | | |
|---|---|---|---|
| 11,582,077 B2* | 2/2023 | Salem ................ | H04L 27/0006 |
| 11,751,251 B2* | 9/2023 | Li ..................... | H04W 74/0808 |
| | | | 370/329 |
| 11,792,848 B2* | 10/2023 | Salem ................ | H04W 72/21 |
| | | | 370/329 |
| 2018/0062806 A1 | 3/2018 | Jung et al. | |
| 2019/0342045 A1 | 11/2019 | Radulescu et al. | |
| 2021/0345406 A1* | 11/2021 | Myung ............... | H04L 5/0094 |
| 2022/0330338 A1* | 10/2022 | Karaki .............. | H04W 74/0866 |
| 2023/0155871 A1* | 5/2023 | Salem ................ | H04W 72/23 |
| | | | 370/329 |
| 2023/0239917 A1* | 7/2023 | Karaki .............. | H04W 74/02 |
| | | | 370/329 |

FOREIGN PATENT DOCUMENTS

| CN | 107637003 A | 1/2018 |
|---|---|---|
| WO | 2019213383 A1 | 11/2019 |

OTHER PUBLICATIONS

Huawei et al. "Coexistence and channel access for NR unlicensed band operations" 3GPP TSG RAN WG1 Meeting #99 R1-1911866, Nov. 22, 2019(Nov. 22, 2019) section 2. (18 pages).
Huawei et al. "Coexistence and channel access for NR unlicensed band operations" 3GPP TSG RAN WG1 Meeting #98bis R1-1910045, Oct. 20, 2019(Oct. 20, 2019) section 2. (18 pages).
Nokia et al. "Feature Lead's Summary #2 on Channel Access Procedures" 3GPP TSG RAN WG1 Meeting #99 R1-1913517, Nov. 22, 2019(Nov. 22, 2019) the whole document. (28 pages).
International Search Report in the international application No. PCT/CN2020/133558, mailed on Mar. 1, 2021. (4 pages).
Written Opinion of the International Search Authority in the international application No. PCT/CN2020/133558, mailed on Mar. 1, 2021. (4 pages).
Nokia, Nokia Shanghai Bell "Channel access and co-existence for NR-U operation",3GPP TSG RAN WG1 Meeting #99 R1-1912257 Reno, US, Nov. 18-22, 2019. (17 pages).
ZTE, Sanechips, "Remaining issues on DL reference signals and channels design for NR-U" 3GPP TSG RAN WG1 Meeting #99 R1-1911820 Reno, USA, Nov. 18-22, 2019. (12 pages).
Qualcomm Incorporated, "Channel access procedures for NR unlicensed" 3GPP TSG RAN WG1 Meeting #99 R1-1912938 Reno, USA Nov. 18-Nov. 22, 2019. (18 pages).
Nokia, Nokia Shanghai Bell "Remaining details on NR-U uplink signals and channels" 3GPP TSG RAN WG1 Meeting #99 R1-1912259 Reno, USA, Nov. 18-22, 2019. (16 pages).
Nokia et al: "Feature Lead's Summary on Channel Access Procedures", 3GPP Draft; R1-1912258, vol. RAN WG1, No. Reno, US; Nov. 19, 2019 (Nov. 19, 2019), XP051826595. 25 pages.
Supplementary European Search Report in the European application No. 20896284.5, mailed on Nov. 17, 2022. 7 pages.

* cited by examiner

*Primary Examiner* — Brian T O Connor
(74) *Attorney, Agent, or Firm* — PERKINS COIE LLP

(57) ABSTRACT

A method and UE for determining a CPE, and a computer readable medium are provided. The method includes: determining the CPE based on a first information amongst at least one of the following: (i) CPE indication carried in a first DCI, if an UL transmission is scheduled with the first DCI; or (ii) CPE indication configured in a UE-specific RRC configuration; or (iii) CPE indication configured in cell-specific configuration; or (iv) CPE indication carried in a second DCI; or (v) CPE indication carried in a third DCI; or (vi) CPE indication carried in RAR; or (vii) pre-defined CPE indication; or determining CPE based on a second information amongst at least one of the following: (i) frequency domain resource allocation (FDRA) for the UL transmission; or (ii) time domain resource allocation (TDRA) for the UL transmission; or (iii) slot format indicator (SFI); or (iv) COT information.

20 Claims, No Drawings

METHOD AND UE FOR UPLINK TRANSMISSION IN BASE STATION SHARED CHANNEL OCCUPANCY TIME

CROSS-REFERENCE TO RELATED APPLICATIONS

This is a continuation of International Patent Application No. PCT/CN2020/133558, filed on Dec. 3, 2020, which claims priority to International Patent Application No. PCT/IB2019/001430, filed on Dec. 3, 2019, the disclosures of which are hereby incorporated by reference in their entirety.

BACKGROUND

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a device successfully occupies the channel, the transmission duration cannot exceed the Maximum Channel Occupancy Time (MCOT).

On the unlicensed carrier, for the channel occupation time obtained by the base station, it may share the channel occupation time to the UE for transmitting the uplink signal or the uplink channel. In other words, when the base station shares its own channel occupancy time with the UE, the UE can use the LBT mode with higher priority than that used by the UE itself to obtain the channel, thereby obtaining the channel with greater probability.

Cyclic Prefix Extension

There is an agreement about the Listen-Before-Talk (LBT) type and cyclic prefix extension (CPE) indication. 2-bit can be used to indicate both LBT type and CP extension (CPE). However the CP length is a function of values C2, C3 and C1 as shown in table 1 below:

| LBT type | CP extension |
|---|---|
| Cat1 16 μs | C2 * symbol length − 16 μs − TA |
| Cat2 25 μs | C3 * symbol length − 25 μs − TA |
| Cat2 25 μs | C1 * symbol length − 25 μs |
| Cat4 | 0 |

SUMMARY

The present disclosure relates to the field of communication technologies, and in particular, to a method for the UE to determine indicated CP extension.

The communication technology is for example a 5G (fifth generation) network using the 5G NR (New Radio) as radio access technology (RAT) defined by 3GPP. The present disclosure is applicable to 5G NR-U (NR in unlicensed spectrum).

A first object of the present disclosure is a method, performed by a user equipment (UE), for determining a cyclic prefix extension (CPE) when switching from a first Listen-Before-Talk (LBT) category to a second LBT category in base station channel occupancy time (gNB COT), comprising:
  determining the CPE based on a first information amongst at least one of the following:
    1) CPE indication carried in a first downlink control information (DCI), if an uplink (UL) transmission is scheduled with the first DCI; or
    2) CPE indication configured in a UE-specific radio resource control (RRC) configuration; or
    3) CPE indication configured in cell-specific configuration; or
    4) CPE indication carried in a second DCI; or
    5) CPE indication carried in a third DCI; or
    6) CPE indication carried in random access response (RAR); or
    7) pre-defined CPE indication;
  or
  determining the CPE based on a second information amongst at least one of the following:
    1) frequency domain resource allocation (FDRA) for the UL transmission; or
    2) time domain resource allocation (TDRA) for the UL transmission; or
    3) slot format indicator (SFI); or
    4) COT information.

A second object of the present disclosure is a user equipment (UE), operable for determining a cyclic prefix extension (CPE) when switching from a first Listen-Before-Talk (LBT) category to a second LBT category in base station channel occupancy time (gNB COT), comprising one or more processors configured to:
  determine the CPE based on a first information amongst at least one of the following:
    1) CPE indication carried in a first downlink control information (DCI), if an uplink (UL) transmission is scheduled with the first DCI; or
    2) CPE indication configured in a UE-specific radio resource control (RRC) configuration; or
    3) CPE indication configured in cell-specific configuration; or
    4) CPE indication carried in a second DCI; or
    5) CPE indication carried in a third DCI; or
    6) CPE indication carried in random access response (RAR); or
    7) pre-defined CPE indication;
  or
  determine the CPE based on a second information amongst at least one of the following:
    1) frequency domain resource allocation (FDRA) for the UL transmission; or
    2) time domain resource allocation (TDRA) for the UL transmission; or
    3) slot format indicator (SFI); or
    4) COT information.

A third object of the present disclosure is a non-transitory computer readable medium comprising program instructions for causing a user equipment to perform the steps of the method according to the first object.

DETAILED DESCRIPTION

Problem Statement

When the base station (gNB—next generation node B) schedules PUSCH or pre-configures PUSCH resources, the PUSCH resources might not be in the gNB's channel occupancy time (COT), in this case, UE will perform LBT category 4 (Cat4). But later on, when the gNB obtains a new COT before the scheduled or pre-configured PUSCH occurs, the gNB can share the COT with the UE, then UE might be able to adapt its LBT category from Cat4 to Cat2. However, when the UE is scheduled with Cat4, the indicated CPE might not be suitable for Cat2, thus how does the UE determine a CPE for Cat2 switching is an open issue.

In recent discussions, there are agreements about the UE which can switch the previously scheduled Cat4 to Cat2 with 25 µs gap, based on the indicated remaining COT. However, when UE switches from Cat4 to Cat2, the CP extension (CPE) is not known. This issue is more severe in the fallback DCI scheduled PUSCH, this is because in fallback DCI, the CPE is always zero when Cat4 is indicated.

Otherwise, it is generally agreed that the UE determines if a Cat 4 uplink (UL) transmission can be switched to Cat 2 LBT with 25 µs duration within a gNB initiated COT in indicated available LBT bandwidths, based on the indicated remaining channel occupancy duration;

If UEs with configured grant UL transmissions may apply the switch to Cat. 2, the gNB ensures that the COT is acquired using the highest CAPC.

The disclosure proposes a method, performed by UE, for determining a CPE when switching from a first LBT category to a second LBT category in gNB COT, comprising the steps of:

determining the CPE based on a first information amongst at least one of the following:
1) CPE indication carried in a first DCI, if an UL transmission is scheduled with the first DCI; or
2) CPE indication configured in a UE-specific RRC configuration; or
3) CPE indication configured in cell-specific configuration; or
4) CPE indication carried in a second DCI; or
5) CPE indication carried in a third DCI; or
6) CPE indication carried in RAR; or
7) pre-defined CPE indication;
or
determining the CPE based on a second information amongst at least one of the following:
1) frequency domain resource allocation (FDRA) for the UL transmission; or
2) time domain resource allocation (TDRA) for the UL transmission; or
3) slot format indicator (SFI); or
4) COT information.

In some implementations, the first DCI is a downlink control indicator CRC scrambled by C-RNTI; or CS-RNTI; or TC-RNTI; or MCS-RNTI.

In some implementations, the first DCI is chosen amongst one of the following formats: DCI format 0_1, DCI format 1_1, DCI format 0_0, DCI format 1_0.

In some implementations, the CPE is indicated in the first DCI, the method further comprising the step of: using the indicated CPE when performing the second LBT category in gNB COT.

In some implementations, the CPE is indicated in the first DCI, the method further comprising the step of: using the indicated CPE when UE performs the second LBT category in gNB COT, if a first condition is satisfied, the first condition being that the indicated CPE contains a gap duration which is equal to the first gap duration of the second LBT category.

In some implementations, the first gap duration is 25 us or 16 us.

In some implementations, the CPE is indicated in the second DCI, the method further comprising the step of: using the indicated CPE when performing the second LBT category in gNB COT.

In some implementations, the CPE is indicated in the first DCI and the second DCI; the method further comprising the step of: using the indicated CPE in the first DCI when performing the second LBT category in gNB COT, if a first condition is satisfied, the first condition being that the indicated CPE contains a gap duration which is equal to the first gap duration of the second LBT category, otherwise, using the indicated CPE in the second DCI.

In some implementations, the second DCI is the DCI that is sent to a group of user equipments.

In some implementations, the second DCI is a DCI format 2_0.

In some implementations, the method comprises the step of: determining the CPE, when performing the second LBT category in gNB COT, from the UE-specific RRC configuration.

In some implementations, the UE-specific RRC configuration, carrying CPE indication, is selected amongst one of the following explicit or implicit CPE indication:
LBT configuration; or
PUSCH-LBT-CPext-CAPC-r16; or
DLDCI-triggered-UL-LBT-CPext-r16; or
ConfiguredgrantConfig.

In some implementations, the method comprises the step of: determining the CPE, when performing the second LBT category in gNB COT, from the cell-specific RRC configuration.

In some implementations, the cell-specific RRC configuration is SIB1.

In some implementations, the method comprises the step of: determining the CPE, when performing the second LBT category in gNB COT, by a predefined CPE.

In some implementations, the predefined CPE is a direct CPE value or a predefined CPE formula with parameters being further determined by UE-specific or cell-specific RRC configurations.

In some implementations, the CPE is indicated in the first DCI, the method further comprising the step of: using the indicated CPE in the first DCI when performing the second LBT category in gNB COT, if a first condition is satisfied, the first condition being that the indicated CPE contains a gap duration which is equal to the first gap duration of the second LBT category, otherwise, using the predefined CPE.

In some implementations, the CPE is indicated in the third DCI, the method further comprising the step of: using the indicated CPE when performing the second LBT category in gNB COT.

In some implementations, the third DCI is the DCI that activates the configured grant function.

In some implementations, the CPE is based on the second information such that:
if the FDRA indicates that UL transmission occupies the full LBT bandwidth, UE determines the CPE is equal to the first CPE value; otherwise CPE is equal to the second CPE value; or if the scheduled UL transmission resources, derived from TDRA, are the first UL resources (based on SFI) between the reception of the second DCI and the COT end (derived from COT information), UE determines the CPE is equal to the first CPE value; otherwise CPE is equal to the second CPE value; or if the symbols before the scheduled UL transmission resources are non UL symbols, UE determines the CPE is equal to the first CPE value; otherwise CPE is equal to the second CPE value.

In some implementations, the first CPE and the second CPE values can be any one of the following, where the first CPE is different from the second CPE, $CPE=0$;

$CPE=C1*Ls-16 \mu s-TA$;

$CPE=C2*Ls-25 \mu s-TA$;

$CPE=C3*Ls-25 \mu s$, where C1, C2, C3 are integers and Ls is OFDM symbol length, TA is UE-specific timing advance.

In some implementations, the first LBT category is type1-UL channel access or Category 4 (Cat4), the second LBT category is type 2C UL channel access or type 2B channel access or type 2A channel access.

In some implementations, the type 2C channel access is category 1 (Cat1) with 16 μs gap duration, type 2B channel access is category 1 with 16 μs gap duration and Type 2A channel access is category 2 (Cat2) with 25 μs gap duration.

Example 1

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and a non-zero CPE. UE assumes that when the UL transmission is outside the gNB COT, UE will perform LBT Type 1 UL channel access and CPE=0. But once the UL transmission is inside gNB COT, UE will switch Type 1 UL channel access to Type 2A UL channel access and the CPE to be used with Type 2A UL channel access being the indicated non-zero CPE. The gNB COT information is given in DCI 2_0.

Example 2

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and a CPE (zero-value or non-zero-value). UE assumes that when the UL transmission is outside the gNB COT, UE will perform LBT Type 1 UL channel access and the indicated CPE. Moreover once the UL transmission is inside gNB COT, UE will switch Type 1 UL channel access to Type 2A UL channel access and the CPE to be used with Cat2 being the indicated CPE. The gNB COT information is given in DCI 2_0. Thus, in this example, UE always uses the indicated CPE value for both Type 1 UL channel access and Type 2A UL channel access LBT.

Example 3

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and a $CPE=C2*Ls-25$ us-TA. When UE switches to Type 2A UL channel access (aka. Cat2 with 25 us gap duration) in gNB COT, UE finds that the indicated CPE contains 25 us gap duration, which is matched with type 2A UL channel access, thus UE uses the indicated CPE. If the indicated $CPE=C1*Ls-16$ us-TA, then UE will know that the gap duration between Type2A UL channel access and indicated CPE are not match. UE will ignore the indicated CPE.

Example 4

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE=0. UE assumes that when the UL transmission is outside the gNB COT, UE will perform LBT Type 1 UL channel access and CPE=0. But once the UL transmission is inside gNB COT, UE will switch Type 1 UL channel access to Type 2A UL channel access and the CPE to be used is a pre-defined value, whose value can be selected from the following:

$CPE=C2*Ls-25$ us-TA $CPE=C3*Ls-25$ us where C2, C3 are integers and Ls is OFDM symbol length, TA is UE-specific timing advance.

Example 5

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE=0. UE assumes that when the UL transmission is outside the gNB COT, UE will perform LBT Type 1 UL channel access and CPE=0. But once the UL transmission is inside gNB COT, UE will switch Type 1 UL channel access to Type 2A UL channel access and the CPE to be used is configured in UE-specific RRC configuration, e.g.

LBT configuration; or
PUSCH-LBT-CPext-CAPC-r16; or
DLDCI-triggered-UL-LBT-CPext-r16.

Example 6

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE. UE assumes that when the UL transmission is outside the gNB COT, UE will perform LBT Type 1 UL channel access and CPE. But once the UL transmission is inside gNB COT, UE will switch Type 1 UL channel access to Type 2A UL channel access. UE will first check if the indicated CPE's gap duration is matched with Type 2A UL channel access, if so, UE will use the indicated CPE; otherwise UE will use the RRC configured CPE. The RRC configuration can happen in the following Information Element (IE) e.g.

LBT configuration; or
PUSCH-LBT-CPext-CAPC-r16; or
DLDCI-triggered-UL-LBT-CPext-r16.

Example 7

In this example, UE is configured with type 1 configured grant UL transmission. In the configuredgrantConfig configuration, the network indicates a CPE value for case of switching from Type 1 UL channel access to Type 2A UL channel access. UE assumes that once the UL transmission is inside gNB COT, UE will switch Type 1 UL channel access to Cat2 and the CPE to be used with Type 2A UL channel access being configured in this RRC configuration.

Example 8

In this example, UE is configured with type 2 configured grant UL transmission. In the DCI that actives the configured grant function, the network indicates a CPE value for case of switching from Type 1 UL channel access to Type 2A UL channel access. UE assumes that once the UL transmission is inside gNB COT, UE will switch Type 1 UL channel access to Type 2A UL channel access and the CPE to be used with Type 2A UL channel access being configured in this activation DCI.

Example 9

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE. UE assumes that when the UL transmission is outside the gNB COT, UE will perform LBT Type 1 UL channel access and CPE. But once the UL transmission is inside gNB COT, UE will switch Type 1 UL channel access to Type 2A UL channel access and the UE will use the configured CPE from cell-specific configuration, e.g. SIB 1.

Example 10

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE. UE assumes that when the UL transmission is outside the gNB COT, UE will perform LBT Type 1 UL channel access and CPE. But once the UL transmission is inside gNB COT, UE will switch Type 1 UL channel access to Type 2A UL channel access and the CPE to be used is determined by the following. UE checks the FDRA, if the frequency domain allocation occupies the full LBT bandwidth, e.g. all interlace indices are allocated to the UE, UE will select a pre-defined CPE value (CPE1), whose values can be any of the following:

$CPE = C2 * Ls - 25 \text{ us} - TA$;

$CPE = C3 * Ls - 25 \text{ us}$.

If the frequency domain allocation does not occupy the full LBT bandwidth, UE will select a different CPE (CPE2) value, whose value is also pre-defined from the following candidates. Note that CPE1 is not equal to CPE2.

$CPE = C2 * Ls - 25 \text{ us} - TA$;

$CPE = C3 * Ls - 25 \text{ us}$.

Note that this also applies to configured grant UL transmission.

Example 11

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE. UE assumes that when the UL transmission is outside the gNB COT, UE will perform LBT Type 1 UL channel access and CPE. But once the UL transmission is inside gNB COT, UE will switch Type 1 UL channel access to Type 2A UL channel access and the CPE to be used is determined by the following. UE checks the TDRA, and SFI and/or COT information. If the allocated time domain resource for UL transmission is the first UL resource within the gNB COT, UE will select a pre-defined CPE value (CPE1), whose value can be any of the following:

$CPE = C2 * Ls - 25 \text{ us} - TA$;

$CPE = C3 * Ls - 25 \text{ us}$.

Otherwise, UE will select a different CPE (CPE2) value, whose value is also pre-defined from the following candidates. Note that CPE1 is not equal to CPE2.

$CPE = C2 * Ls - 25 \text{ us} - TA$;

$CPE = C3 * Ls - 25 \text{ us}$.

Note that this also applies to configured grant UL transmission.

Example 12

In this example, UE receives DCI 0_0 or DCI 0_1 or DCI 1_0 or DCI 1_1 scheduling UL transmission. In DCI 0_0 or DCI 0_1 or DCI 1_0 or DCI 1_1, it indicates Type 1 UL channel access and CPE. UE assumes that when the UL transmission is outside the gNB COT, UE will perform LBT Type 1 UL channel access and CPE. But once the UL transmission is inside gNB COT, UE will switch Type 1 UL channel access to Type 2A UL channel access and the CPE to be used is determined by the following. UE checks the TDRA, and SFI and/or COT information. If there are non UL symbols, i.e. downlink symbol or flexible symbol, immediately before the allocated UL resource within the gNB COT, UE will select a pre-defined CPE value (CPE1), whose value can be any of the following:

$CPE = C2 * Ls - 25 \text{ us} - TA$;

$CPE = C3 * Ls - 25 \text{ us}$.

Otherwise, UE will select a different CPE (CPE2) value, whose value is also pre-defined from the following candidates. Note that CPE1 is not equal to CPE2.

$CPE = C2 * Ls - 25 \text{ us} - TA$;

$CPE = C3 * Ls - 25 \text{ us}$.

Note that this also applies to configured grant UL transmission.

List of abbreviations in the description and drawings:

| Acronyms | Full name |
| --- | --- |
| LTE | Long Term Evolution |
| LTE-A | Advanced long term evolution |
| NR | New Radio |
| NR-U | New Radio-unlicensed |
| BS | Base Station |
| UE | User Equipment |
| COT | Channel Occupancy Time |
| PUCCH | Physical uplink control channel |
| DCI | Downlink control information |
| LBT | Listen Before Talk |
| MCOT | Maximum Channel Occupancy Time |
| CP | Cyclic Prefix |
| CPE | Cyclic Prefix Extension |

| Acronyms | Full name |
|---|---|
| RRC | Radio Resource Control |
| LBT | Listen Before Talk |
| gNB | gNode B |
| CAPC | Channel Access Priority Class |
| CG | Common Group |
| LBE | Load Based Equipment |

In the above description, the mobile telecommunication system is a 5G mobile network comprising a 5G NR access network. The present example embodiment is applicable to NR in unlicensed spectrum (NR-U). The present disclosure can be applied to other mobile networks, in particular to mobile network of any further generation cellular network technology (6G, etc.). The above is only a specific implementation manner of the present disclosure, the protection scope of the present disclosure is not limited thereto, and changes or substitutions that can easily be thought of by those skilled in the art within the technical scope disclosed in the present disclosure should be covered by the protection scope of the present disclosure. Therefore, the protection scope of the present disclosure should be subject to the protection scope of the claims.

The various embodiments/examples, aspects and features, if any, described in this specification that do not fall under the scope of the independent claims are to be interpreted as examples useful for understanding various embodiments of the disclosure.

What is claimed is:

1. A method, performed by a user equipment (UE), for determining a cyclic prefix extension (CPE) when the UE switches a Listen-Before-Talk (LBT) category of the UE from a first LBT category to a second LBT category in base station channel occupancy time (gNB COT), comprising:
   determining the CPE based on a first information amongst at least one of the following:
   CPE indication carried in a first downlink control information (DCI), if an uplink (UL) transmission is scheduled with the first DCI; or
   pre-defined CPE indication.

2. The method according to claim 1, wherein the first DCI is chosen amongst one of the following formats:
   DCI format 0_1, DCI format 1_1, DCI format 0_0, or DCI format 1_0.

3. The method according to claim 2, wherein the CPE is indicated in the first DCI, the method further comprising:
   using the indicated CPE when performing the second LBT category in gNB COT.

4. The method according to claim 2, wherein the CPE is indicated in the first DCI, the method further comprising:
   using the indicated CPE when UE performs the second LBT category in gNB COT, if a first condition is satisfied, the first condition being that the indicated CPE contains a gap duration which is equal to a first gap duration of the second LBT category.

5. The method according to claim 4, wherein the first gap duration is 25 us or 16 us.

6. The method according to claim 1, further comprising:
   determining the CPE, when performing the second LBT category in gNB COT, by a predefined CPE.

7. The method according to claim 6, wherein the predefined CPE is a direct CPE value or a predefined CPE formula with parameters being further determined by UE-specific or cell-specific RRC configurations.

8. The method according to claim 1, wherein the first LBT category is type1-UL channel access or Category 4 (Cat4), the second LBT category is type 2C UL channel access or type 2B channel access or type 2A channel access.

9. The method according to claim 8, wherein the type 2C UL channel access is category 1 (Cat1) with 16 μs gap duration, the type 2B channel access is category 2 with 16 μs gap duration and the type 2A channel access is category 2 (Cat2) with 25 μs gap duration.

10. A user equipment (UE), operable for determining a cyclic prefix extension (CPE) when the UE switches a Listen-Before-Talk (LBT) category of the UE from a first LBT category to a second LBT category in base station channel occupancy time (gNB COT), comprising one or more processors configured to:
    determine the CPE based on a first information amongst at least one of the following:
    CPE indication carried in a first downlink control information (DCI), if an uplink (UL) transmission is scheduled with the first DCI; or
    pre-defined CPE indication.

11. The UE according to claim 10, wherein the first DCI is chosen amongst one of the following formats:
    DCI format 0_1, DCI format 1_1, DCI format 0_0, or DCI format 1_0.

12. The UE according to claim 11, wherein the CPE is indicated in the first DCI, and the one or more processors are further configured to:
    use the indicated CPE when performing the second LBT category in gNB COT.

13. The UE according to claim 11, wherein the CPE is indicated in the first DCI, and the one or more processors are further configured to:
    use the indicated CPE when the UE performs the second LBT category in gNB COT, if a first condition is satisfied, the first condition being that the indicated CPE contains a gap duration which is equal to a first gap duration of the second LBT category.

14. The UE according to claim 13, wherein the first gap duration is 25 us or 16 us.

15. The UE according to claim 10, wherein the one or more processors are further configured to:
    determine the CPE, when performing the second LBT category in gNB COT, by a predefined CPE.

16. The UE according to claim 15, wherein the predefined CPE is a direct CPE value or a predefined CPE formula with parameters being further determined by UE- specific or cell-specific RRC configurations.

17. The UE according to claim 10, wherein the first LBT category is type1-UL channel access or Category 4 (Cat4), the second LBT category is type 2C UL channel access or type 2B channel access or type 2A channel access.

18. The UE according to claim 17, wherein the type 2C UL channel access is category 1 (Cat1) with 16 μs gap duration, the type 2B channel access is category 2 with 16 μs gap duration and the type 2A channel access is category 2 (Cat2) with 25 μs gap duration.

19. A non-transitory computer readable medium comprising program instructions for causing a user equipment (UE) to perform a method for determining a cyclic prefix extension (CPE) when the UE switches a Listen-Before-Talk (LBT) category of the UE from a first LBT category to a second LBT category in base station channel occupancy time (gNB COT), the method comprising:
    determining the (CPE) based on a first information amongst at least one of the following:
    pre-defined CPE indication.

20. The non-transitory computer readable medium according to claim 19, wherein the first DCI is chosen amongst one of the following formats:

DCI format 0_1, DCI format 1_1, DCI format 0_0, or DCI format 1_0.

* * * * *